(12) United States Patent
Choi et al.

(10) Patent No.: US 11,223,058 B2
(45) Date of Patent: Jan. 11, 2022

(54) FUEL CELL SYSTEM

(71) Applicant: MICO POWER LTD., Anseong-si (KR)

(72) Inventors: Song Ho Choi, Hwaseong-si (KR); Jun Woo Lee, Anseong-si (KR)

(73) Assignee: MICO CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/050,156

(22) PCT Filed: Apr. 25, 2019

(86) PCT No.: PCT/KR2019/005006
§ 371 (c)(1),
(2) Date: Oct. 23, 2020

(87) PCT Pub. No.: WO2019/209045
PCT Pub. Date: Oct. 31, 2019

(65) Prior Publication Data
US 2021/0083307 A1    Mar. 18, 2021

(30) Foreign Application Priority Data

Apr. 26, 2018 (KR) ........................ 10-2018-0048765

(51) Int. Cl.
*H01M 8/0612* (2016.01)
*C01B 3/38* (2006.01)
(Continued)

(52) U.S. Cl.
CPC ........... *H01M 8/0618* (2013.01); *C01B 3/384* (2013.01); *H01M 8/04022* (2013.01); *H01M 8/04067* (2013.01); *C01B 2203/0822* (2013.01)

(58) Field of Classification Search
CPC ........... H01M 8/04007; H01M 8/0618; H01M 8/04022; H01M 8/04067; C01B 3/384
See application file for complete search history.

(56) References Cited

U.S. PATENT DOCUMENTS

2003/0093949 A1* 5/2003 Goebel ............... H01M 8/0618
48/127.9
2003/0235731 A1* 12/2003 Haltiner, Jr. ...... H01M 8/04089
429/434
(Continued)

FOREIGN PATENT DOCUMENTS

JP    2007287428    11/2007
JP    2015220020    12/2015
(Continued)

*Primary Examiner* — Matthew J Merkling
(74) *Attorney, Agent, or Firm* — Norton Rose Fulbright US LLP (57) ABSTRACT

A fuel cell system is disclosed. The fuel cell system includes: a fuel cell module including a plurality of unit cells for generating electrical energy by using oxygen of air and hydrogen of a reformed fuel gas; a first module including a burner part which burns an unreacted fuel gas and air discharged from the fuel cell module, an air-heating part which heats air through heat exchange with a hot combustion gas and a flame generated by the burner part and supplies the heated air to the fuel cell module, and a water vapor generation part which converts water, flowing through an inner portion thereof, into water vapor through heat exchange with a hot combustion gas generated by the burner part; and a second module which mixes a fuel supplied from an external fuel supply source and water vapor supplied from a water-vapor generator part.

14 Claims, 3 Drawing Sheets

(51) Int. Cl.
*H01M 8/04014* (2016.01)
*H01M 8/04007* (2016.01)

(56) References Cited

U.S. PATENT DOCUMENTS

| | | | | |
|---|---|---|---|---|
| 2006/0188761 | A1* | 8/2006 | O'Brien | H01M 8/04164 |
| | | | | 429/411 |
| 2007/0196704 | A1* | 8/2007 | Valensa | H01M 8/0618 |
| | | | | 429/423 |
| 2008/0118800 | A1* | 5/2008 | Devriendt | H01M 8/04067 |
| | | | | 429/423 |
| 2012/0178003 | A1* | 7/2012 | Venkataraman | H01M 8/2432 |
| | | | | 429/408 |
| 2016/0293984 | A1* | 10/2016 | Kang | H01M 8/0662 |
| 2017/0012309 | A1* | 1/2017 | Venkat | H01M 8/0618 |
| 2018/0191006 | A1* | 7/2018 | Shin | H01M 8/0606 |

FOREIGN PATENT DOCUMENTS

| | | |
|---|---|---|
| JP | 2016062722 | 4/2016 |
| KR | 1020140081081 | 7/2014 |
| KR | 1020170002141 | 1/2017 |

\* cited by examiner

FUEL CELL SYSTEM

CROSS REFERENCE TO RELATED APPLICATIONS

This application is a national phase under 35 U.S.C. § 371 of International Application No. PCT/KR2019/005006, filed Apr. 25, 2019, which claims the benefit of priority to Korean Patent Application Serial No. 10-2018-0048765, filed Apr. 26, 2018. The contents of the referenced applications are incorporated into the present application by reference.

FIELD OF THE INVENTION

The present disclosure relates to a fuel cell system that generates electrical energy using hydrocarbon fuel and air.

DESCRIPTION OF RELATED ART

A fuel cell generates electricity using reaction between hydrogen and oxygen. The fuel cell has the highest efficient when using hydrogen directly. However, installing a hydrogen storage tank directly where the fuel cell is installed causes a safety problem. Therefore, at present, hydrocarbon fuel is reformed to produce hydrogen which in turn is used as fuel in the fuel cell. A method of reforming the hydrocarbon fuel includes a water vapor reforming method in which hydrogen is generated by reacting water vapor with hydrocarbon fuel.

In a fuel cell system operating in a high temperature, such as a solid oxide fuel cell (SOFC) system or a molten carbonate fuel cell (MCFC) system, in order to improve electricity generation efficiency and to operate the system stably, fuel gas and air should be heated to a temperature above a certain temperature and then be fed to a fuel cell module.

In such a fuel cell system, the reformed fuel gas needs to be stably and uniformly supplied to the fuel cell module, and the fuel gas and air are required to be heated using combustion equipment having a minimal number of component.

SUMMARY OF THE INVENTION

A purpose of the present disclosure is to provide a fuel cell system that may not only improve thermal efficiency, but also improve reforming efficiency and electricity generation efficiency.

One aspect of the present disclosure provides a fuel cell system comprising: a fuel cell module including a plurality of unit cells for generating electric energy using oxygen of air and hydrogen of reformed fuel gas; a first module including: a burner to burn unreacted fuel gas and air discharged from the fuel cell module; a heat-transfer device placed adjacent to the burner to heat air via heat exchange thereof with flame and hot combusted gas generated from the burner and to supply the heated air to the fuel cell module; and a water-vapor generator disposed adjacent to the burner to convert water moving therein to water vapor via heat exchange thereof with the hot combusted gas; and a second module placed adjacent to the first module, wherein the second module is configured to: mix fuel supplied from an external fuel supply source and the water vapor supplied from the water-vapor generator with each other to form a mixture; perform a water vapor reforming reaction of the mixture; and supply the reformed fuel gas to the fuel cell module.

In one embodiment, the heat-transfer device includes: a first container having a first inner space defined therein, wherein the first container has a bottom having a first opening and a second opening defined therein for exposing the first inner space, wherein the first opening and the second opening are spaced from each other; and a heat-exchange pipe received in the first inner space and having an inlet connected to an external air supply source and an outlet connected to the fuel cell module, wherein the burner includes: an outer casing coupled to the bottom of the first container, wherein the outer casing has an open top and has a second inner space communicating with the first inner space through the first opening; an inner casing received in the second inner space, wherein the inner casing has a third inner space defined therein, wherein a horizontal cross sectional area of the third inner space increases as the third inner space extends upwards, and wherein the inner casing has an open top, and a side wall having through-holes defined therein communicating the second inner space and the third inner space with each other; an ignition device received in the third inner space; a fuel supply pipe connected to the inner casing for supplying the unreacted fuel gas discharged from the fuel cell module to the third inner space; and an air supply pipe connected to the outer casing for supplying the unreacted air discharged from the fuel cell module to the second inner space, wherein the water-vapor generator includes: a second container having a fourth inner space defined therein communicating with the first inner space through the second opening, wherein the second container is coupled to the bottom of the first container and is disposed adjacent to the outer casing; and a vaporization pipe received in the fourth inner space and having an inlet connected to an external water supply source and an outlet connected to the second module.

In one embodiment, the first container further includes a fluid guide plate protruding from the bottom of the first container to a first height. In one embodiment, the first height is smaller than a height of the first inner space, wherein a width of the fluid guide plate is equal to a width of the first inner space.

In one embodiment, the heat-exchange pipe includes a plurality of straight portions extending in a parallel manner, and bent portions, each bent portion connecting adjacent straight portions to each other, wherein the fluid guide plate passes through at least some of the straight portions.

In one embodiment, the burner further includes a diffusion mesh network disposed at an outlet of the fuel supply pipe to diffuse the unreacted fuel gas discharged from the fuel supply pipe.

In one embodiment, an area of the second opening is smaller than an area of a top face of the fourth inner space.

In one embodiment, the second container contacts the outer casing.

In one embodiment, the second container has a combusted gas outlet to discharge combusted gas supplied from the first inner space through the second opening to an outside.

In one embodiment, the second module includes: a mixer for mixing fuel supplied from the external fuel supply source and water vapor supplied from the water-vapor generator with each other to form a mixed fuel gas; a first heat exchanger placed on top of the mixer for heating the mixed fuel gas supplied from the mixer via heat exchange thereof with hot unreacted fuel gas supplied from the fuel cell module; a reformer placed on top of the first heat exchanger for performing a water vapor reforming reaction of the heated mixed fuel gas supplied from the first heat exchanger to generate the reformed fuel gas; and a second heat exchanger placed on top of the reformer for heating the reformed fuel gas supplied from the reformer via heat exchange thereof with hot unreacted air supplied from the fuel cell module and supplying the heated reformed fuel gas to the fuel cell module.

In one embodiment, the second module further include a container for receiving therein at least one of the mixer, the first heat exchanger, the reformer and the second heat exchanger.

In one embodiment, the mixer includes: an outer housing having an inner space defined therein and having an outlet for connecting the inner space thereof with the first heat exchanger; a first pressure-pulsation prevention plate received in the inner space of the outer housing to divide the inner space thereof into a first space and a remaining space, wherein first through-holes are defined in the first pressure-pulsation prevention plate; a second pressure-pulsation prevention plate received in the inner space of the outer housing and disposed on top of the first pressure-pulsation prevention plate, wherein the second pressure-pulsation prevention plate divides the remaining space to a second space connected to the first heat exchanger through the outlet and a third space located between the first space and the second space, wherein second through-holes are defined in the second pressure-pulsation prevention plate; an inner housing received in the inner space of the outer housing and disposed on top of the second pressure-pulsation prevention plate, wherein the inner housing is disposed in the second space and has a fourth space defined therein, wherein the inner housing has third through-holes for communicating the second space and the fourth space with each other, wherein the water vapor is supplied to one of the first space and the fourth space, and the fuel is supplied to the other of the first space and the fourth space.

In one embodiment, the mixer further includes: a water vapor supply pipe coupled to the outer housing and connected to the first space for receiving the water vapor from the water-vapor generator and supplying the water vapor to the first space; and a fuel supply pipe coupled to the outer housing and the inner housing and connected to the fourth space for supplying the fuel received from the fuel supply source to the fourth space.

In one embodiment, each of the first and second pressure-pulsation prevention plates has a central region and a peripheral region surrounding the central region, wherein the first through-holes are formed in the central region of the first pressure-pulsation prevention plate, wherein the second through-holes are formed in the peripheral region of the second pressure-pulsation prevention plate. In one embodiment, a position of the fourth space corresponds to the central region of the second pressure-pulsation prevention plate.

In the fuel cell system according to the present disclosure, the heat-transfer device, the burner and the water-vapor generator are collected to form the first module, and the mixer, the first heat exchanger, the reformer and the second heat exchanger are collected to form the second module. Thus, a length of a pipe connecting the components to each other in each module may be minimized, thereby to minimize differential pressure and heat loss, as well as simplify an assembly process of the system and allow easy maintenance.

Moreover, the first module heats the air and generates the water vapor using one combustion device that burns the unreacted fuel gas and air, thereby to improve thermal efficiency. The water-vapor generator is capable of reducing the pressure-pulsation, such that the fuel gas may be uniformly supplied to the fuel cell module. Further, since the mixed fuel gas heated via the heat exchange is supplied to the reformer, and the reformed fuel gas is heated again via heat exchange and then is supplied to the fuel cell module, reforming efficiency and electricity generation efficiency may be improved.

DETAILED DESCRIPTIONS

Hereinafter, embodiments of the present disclosure will be described in detail with reference to the accompanying drawings. The present disclosure may be modified in various ways and may take many forms. Specific embodiments are illustrated in the drawings and described in detail herein. However, the embodiments are not intended to limit the present disclosure thereto. It should be understood that all changes, equivalents, or substitutes thereto are included in scope and spirit of the present disclosure. In describing the drawings, similar reference numerals are used for similar components. In the accompanying drawings, dimensions of structures are shown to be enlarged than actual ones for clarity of the present disclosure.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or greater other features, integers, operations, elements, components, and/or portions thereof.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
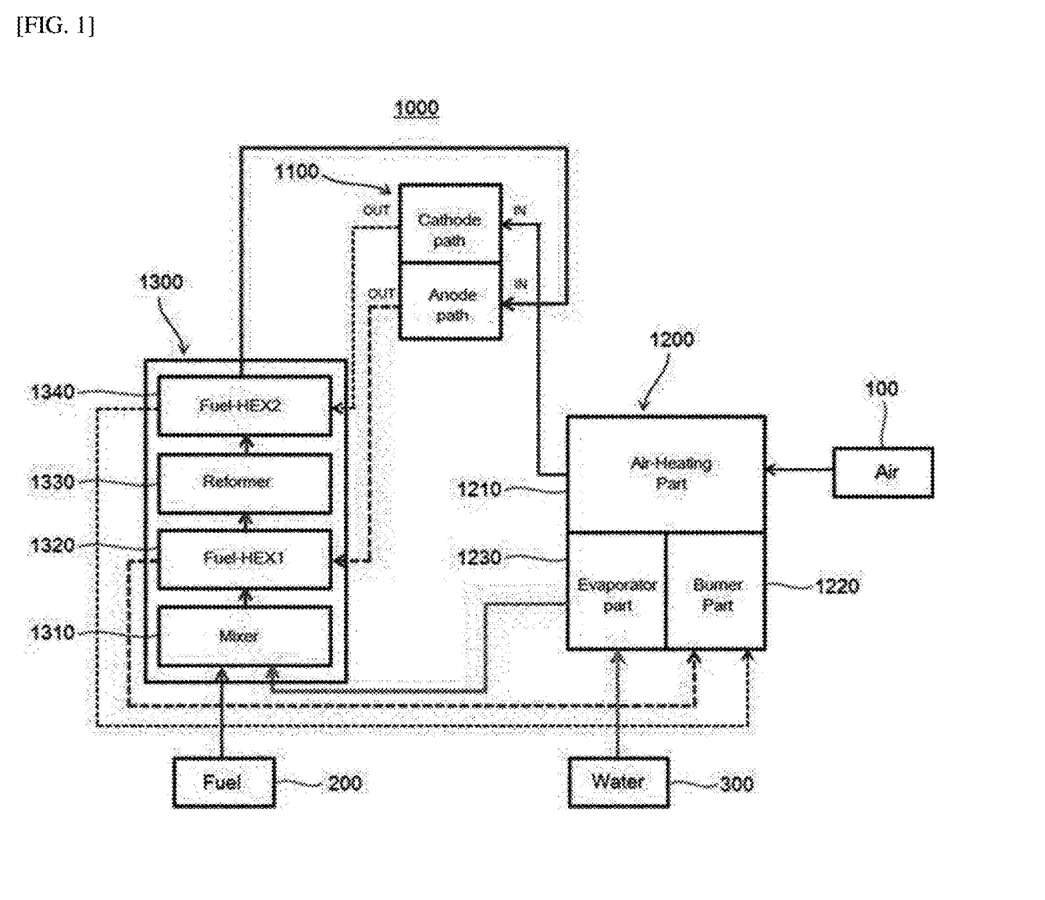
FIG. 1 is a diagram illustrating a fuel cell system according to an embodiment of the present disclosure.
Figure 2:
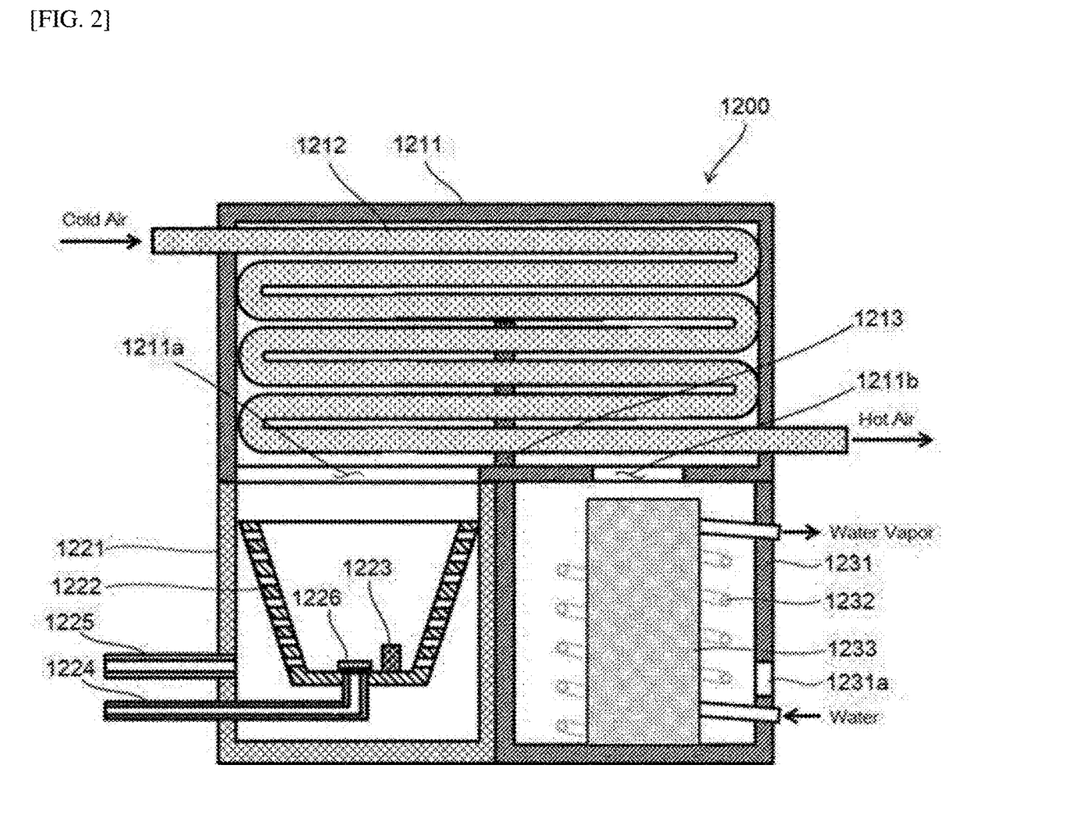
FIG. 2 is a cross-sectional view of a first module shown in FIG. 1.

FIG. 1 is a view for illustrating a fuel cell system according to an embodiment of the present disclosure. FIG. 2 is a cross-sectional view of a first module shown in FIG. 1.

Figure 3:
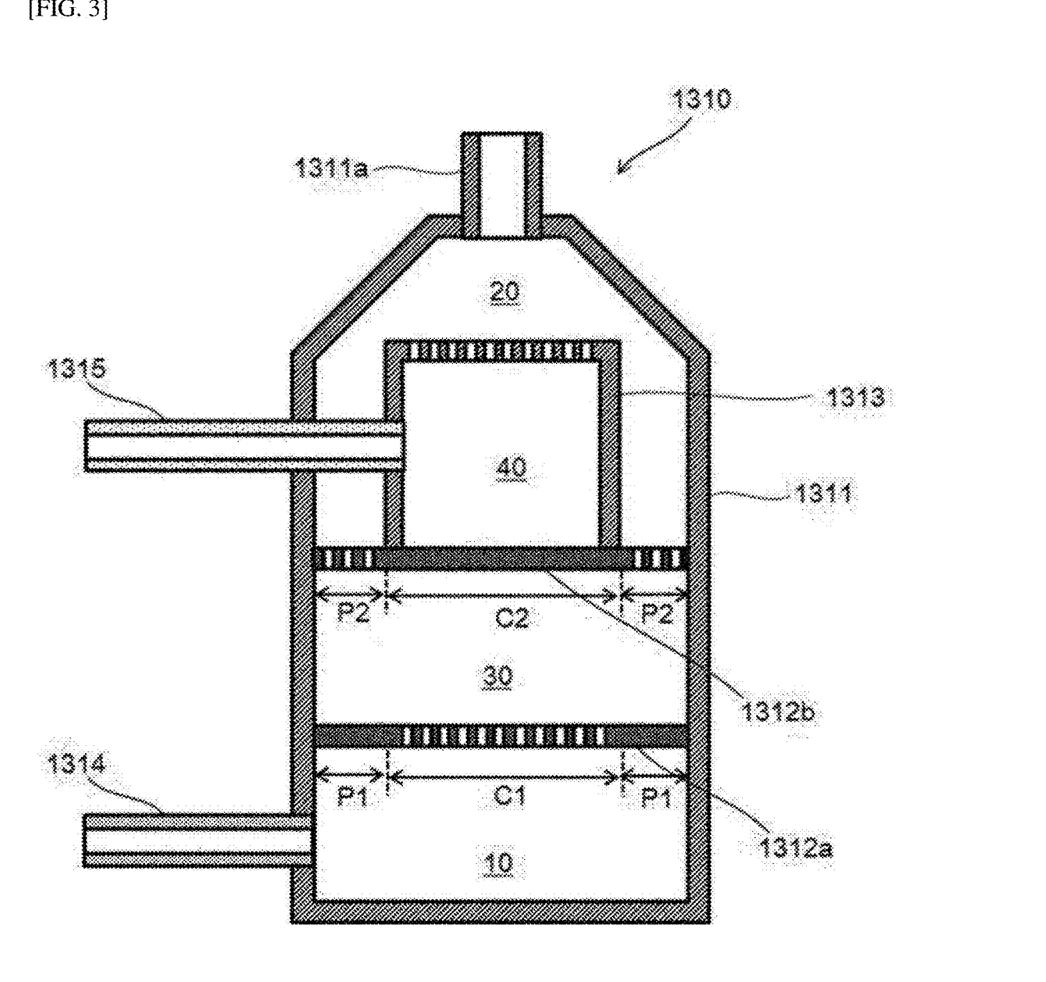
FIG. 3 is a cross-sectional view for illustrating one embodiment of a mixer shown in FIG. 1.

Referring to FIG. 1 to FIG. 3, a fuel cell system 1000 according to an embodiment of the present disclosure may include a fuel cell module 1100, a first module 1200, and a second module 1300. In one embodiment, the fuel cell module 1100, the first module 1200 and the second module 1300 may be disposed inside a hot box (not shown) in which spaces between the fuel cell module 1100, the first module 1200 and the second module 1300 are filled with an insulating material.

The fuel cell module 1100 may include a plurality of unit cells, each unit cell generating electrical energy using oxygen in air and hydrogen in reformed fuel gas. The unit cell may include a fuel electrode (anode), an air electrode (cathode), and an electrolyte positioned therebetween. When fuel gas containing hydrogen ($H_2$) and air containing oxygen ($O_2$) are respectively supplied to the fuel electrode and the air electrode, reduced oxygen ions ($O^{2-}$) are transferred from the air electrode to the fuel electrode via the electrolyte. The oxygen ion ($O^{2-}$) transferred to the fuel electrode reacts with hydrogen ($H_2$) provided to the fuel electrode to produce water ($H_2O$) and electron ($e^-$). The unit cell may generate electrical energy using the electrons generated via the reaction as described above. The reaction between oxygen and hydrogen is an exothermic reaction, so that the fuel cell module 1100 is capable of releasing heat during a power generation mode in which the module 1100 generates electrical energy.

The fuel cell module 1100 may include a solid oxide fuel cell (SOFC) or a molten carbonate fuel cell (MCFC) operating at a temperature of about 500° C. or higher. In one example, the fuel cell module 1110 may include a stack of flat unit cells or may include a bundle of tubular or flat tubular unit cells.

The first module 1200 may heat the air and supply the heated air to the fuel cell module 1100, and may generate water vapor and supply the same to a gas mixer 1310 of the second module 1300.

In one embodiment, the first module 1200 may supply the heated air to the fuel cell module 1100 through a connection plate (not shown). In this case, the connection plate may have channels defined therein to connect a first pipe for supplying hot air generated from the first module 1200 to the fuel cell module 1100 and a second pipe to supply reformed fuel gas generated from the second module 1300 to the fuel cell module 1100 to an air channel (cathode path) and a fuel channel (anode path) defined inside the fuel cell module 1100.

In one embodiment, the connection plate is disposed under the fuel cell module 1100 to support the fuel cell module 1100 thereon. In this case, the first and second modules 1100 and 1200 may be placed under the connection plate.

In another embodiment, the connection plate may be disposed above the fuel cell module 1100. In this case, the first and second modules 1100 and 1200 may be disposed above the connection plate.

In another embodiment, the first and second pipes may be directly connected to the fuel cell module 1100.

In one embodiment, the first module 1200 may include a heat-transfer device 1210, a burner 1220 and a water-vapor generator 1230.

The heat-transfer device 1210 may heat the air supplied from an external air supply source 100 and supply the heated air to the fuel cell module 1100.

In one embodiment, the heat-transfer device 1210 may include a first container 1211 and a heat-exchange pipe 1212.

The first container 1211 may have an inner space defined therein. The heat-exchange pipe 1212 may be placed in the inner space of the first container 1211. In one example, a first opening 1211*a* exposing the inner space of the first container 1211 to the burner 1220 and a second opening 1211*b* exposing the inner space of the first container 1211 to the water-vapor generator 1230 may be defined in a bottom face of the first container 1211.

The heat-exchange pipe 1212 may have a meandering structure having a plurality of straight portions and bent portions, each bent portion connecting adjacent straight portions with each other. The heat-exchange pipe 1212 may have an inlet connected to the external air supply source 100 and an outlet connected to the fuel cell module 1100. In one embodiment, the inlet and the outlet of the heat-exchange pipe 1212 may be disposed outside the first container 1211.

The heat-exchange pipe 1212 may receive heat energy from flame and hot combusted gas generated in the burner 1220, and may use the heat energy to heat the air supplied from the external air supply source 100.

In one embodiment, the first container 1211 further includes a fluid guide plate 1213 protruding from a bottom thereof to a predetermined height to increase a residence time in the first container 1211 of the hot combusted gas supplied from the burner 1220.

The height of the fluid guide plate 1213 from the bottom of the container 1211 is smaller than a vertical height of the inner space of the first container 1211. A width of the fluid guide plate 1213 may be the same as a width of the inner space of the first container 1211. In this case, a portion of the heat-exchange pipe 1212 may penetrate the fluid guide plate 1213.

When such a fluid guide plate 1213 is disposed, the hot combusted gas supplied from the burner 1220 stays in the first container 1211 for a relatively long time, such that more heat energy is supplied to the heat-exchange pipe 1212.

The burner 1220 may be disposed under the heat-transfer device 1210, and may combust unreacted fuel gas and air emitted from the fuel cell module 1100.

In one embodiment, the burner 1210 may include an outer casing 1221, an inner casing 1222, an ignition device 1223, a fuel supply pipe 1224 and an air supply pipe 1225.

The outer casing 1221 may have an inner space having an open top and may be coupled to a bottom of the first container 1211 so that the inner space of the outer casing 1221 is connected to the inner space of the first container 1211 through the first opening 1211*a* of the first container 1211. In this case, the first opening 1211*a* of the first container 1211 may expose an entirety of the inner space of the outer casing 1221. As long as the outer casing 1221 is coupled to the bottom of the first container 1211 so that the inner space of the outer casing 1221 is connected to the inner space of the first container 1211 through the first opening 1211*a* of the first container 1211, a structure of the outer casing 1221 is not particularly limited. In one embodiment, the outer casing 1221 may include a first bottom spaced apart from the bottom of the first container 1211, and a first side wall extending upwardly from an edge of the first bottom, and having a top coupled to the bottom of the first container 1211.

The inner casing 1222 may be placed inside the outer casing 1221. A horizontal width of an inner space of the inner casing 1222 may increase as the inner casing extends upwardly. The inner casing 1222 may have an open top. In one embodiment, the inner casing 1221 may include a second bottom placed above the first bottom, a second side wall extending obliquely and upwardly from an edge of the second bottom such that a cross-sectional area of the inner space increases as it extends upwardly. Through-holes may be formed in the second side wall to allow external air to flow into the inner space of the inner casing 1221.

The ignition device 1223 may be disposed inside the inner casing 1221. The fuel and the air supplied from the fuel supply pipe 1224 and the air supply pipe 1225 may be ignited by the ignition device 1223. A known ignition device may be used without limitation as the ignition device 1223.

The fuel supply pipe 1224 may be coupled to the inner casing 1222, for example, the second bottom thereof. The unreacted fuel gas discharged from the fuel cell module 1100 may be supplied via the fuel supply pipe 1224 to the inner space of the inner casing 1222. In one embodiment, the hot unreacted fuel gas discharged from the fuel cell module 1100 may be first supplied to a first heat exchanger 1320 of the second module 1300 to heat a mixed fuel gas via heat exchange therewith. Then, the fuel supply pipe 1224 may receive the unreacted fuel gas cooled via heat exchange thereof from the first heat exchanger 1320 and supply the cooled unreacted fuel gas to the inner space of the inner casing 1222.

The air supply pipe 1225 may be coupled to the outer casing 1221, for example, the first side wall thereof and may supply the unreacted air discharged from the fuel cell module 1100 to a space out of the inner casing 1222 and in the inner space of the outer casing 1221. The air supplied to the inner space of the outer casing 1221 may be introduced into the inner space of the inner casing 1222 via through-holes formed in the second side wall of the inner casing 1222. In one embodiment, hot unreacted air discharged from the fuel cell module 1100 may be first supplied to a second heat exchanger 1340 of the second module 1300 to heat reformed fuel gas via heat exchange therewith. The air supply pipe 1225 may receive unreacted air cooled via the heat exchange from the second heat exchanger 1340 and supply the cooled unreacted air to the inner space of the outer casing 1221.

In one example, the burner 1220 may further include a diffusion mesh network 1226 disposed at an outlet of the fuel supply pipe 1224 to diffuse the unreacted fuel gas supplied from the fuel supply pipe 1224. In one embodiment, the diffusion mesh network 1226 may be coupled to a top face of the second bottom of the inner casing 1222. The unreacted fuel gas contains relatively low content fuel. When the fuel is diffused through the diffusion mesh network 1226, the fuel may be spread over a larger area. As a result, the burner 1220 may create a larger area of flame.

As described above, the inner space of the inner casing 1222 forming the combustion space has a structure in which a cross-sectional area thereof increases as it goes upwards, and the diffusion mesh network 1226 is disposed at the outlet of the fuel supply pipe 1224. Thus, even when the burner 1220 receives unreacted fuel gas with a relatively low fuel content and unreacted air with a relatively low oxygen content, flame with a larger area may be generated.

The flame and the hot combusted gas generated in the burner 1220 may reach the heat-exchange pipe 1212 through the first opening 1211*a* of the first container 1211 to supply heat energy to the heat-exchange pipe 1212. In this connection, in order to supply more heat energy to the heat-exchange pipe 1212, an area of the first opening 1211*a* may be equal to an area of a top face of the inner space of the outer casing 1222.

The water-vapor generator 1230 may be disposed adjacent to the burner 1220 and under the heat-transfer device 1210, and may convert water supplied from the external water supply source 300 into water vapor via heat exchange thereof with the hot combusted gas generated from the burner 1220.

In one embodiment, the water-vapor generator 1230 may include a second container 1231 and a vaporization pipe 1232.

The second container 1231 may be coupled to the bottom of the first container 1211 so that an inner space of the second container 1231 is connected to the inner space of the first container 1211 through the second opening 1211*b* of the first container 1211. An area of the second opening 1211*b* may be smaller than an area of a top face of the inner space of the second container 1231 so that the hot combusted gas generated from the burner 1220 stays in the inner space of the first container 1211 for a long time. For example, the area of the second opening 1211*b* may be about ⅕ to ⅘ or of the area of the top face of the inner space of the second container 1231.

In one example, in order to minimize heat loss, a side wall of the second container 1231 may contact the outer casing 1221 of the burner 1220.

The vaporization pipe 1232 may be disposed inside the second container 1231, and may have an inlet connected to the external water supply source 300 and an outlet connected to a mixer 1310 of the second module 1300. The vaporization pipe 1232 may receive heat energy from the hot combusted gas as generated from the burner 1220 and supplied into the second container 1231 through the inner space of the first container 1211. Thus, the vaporization pipe 1232 may use the heat energy to convert water moving therein into water vapor.

In order to reduce heat loss, the water-vapor generator 1230 may further include a central structure 1233 which is disposed in the inner space of the second container 1231 and around which the vaporization pipe 1232 is wound.

In one example, the second container 1231 may have a combusted gas outlet 1231*a* that supplies thermal energy to the vaporized pipe 1232 and discharges cooled combusted gas to an outside.

The second module 1300 may mix the fuel supplied from the external fuel supply source 200 and the water vapor supplied from the first module 1200, and then may perform a water vapor reforming reaction thereof and may supply the reformed fuel gas to the fuel cell module 1100. In this connection, the fuel supplied from the fuel supply source 200 may be hydrocarbon fuel chemically containing hydrogen, such as methane ($CH_4$), ethane ($C_2H_6$), propane ($C_3H_8$), butane ($C_4H_{10}$), natural gas, and coal gas. The second module 1300 may be placed adjacent to the first module 1200 to minimize heat loss.

In one embodiment, the second module 1300 may include the mixer 1310, the first heat exchanger 1320, a reformer 1330 and the second heat exchanger 1340.

The mixer 1310 may be placed adjacent to the burner 1220 or the water-vapor generator 1230 of the first module 1200, and receive the fuel and the water vapor from the external fuel supply source 200 and the water-vapor generator 1230, respectively, and may mix the fuel and the water vapor and may supply the mixed fuel gas to the first heat exchanger 1320.

A structure of the mixer 1310 will be described with reference to FIG. 3.

The first heat exchanger 1320 may be placed on top of the mixer 1310, and may receive the mixed fuel gas as the mixture between the fuel and the water vapor from the mixer 1310, and may heat the mixed fuel gas and supply the heated mixed fuel gas to the reformer 1330. In one embodiment, the first heat exchanger 1320 may receive the hot unreacted fuel gas from the fuel cell module 1100, and may heat the fuel gas via heat exchange thereof with the hot unreacted fuel gas. A structure of the first heat exchanger 1320 is not particularly limited. A known heat exchanger structure for a fuel cell may be applied without limitation.

The reformer 1330 may be placed on top of the first heat exchanger 1320, and may generate hydrogen as a portion of the fuel via the water vapor reforming reaction as shown in a following Reaction Formula 1, and may supply the reformed fuel gas to the second heat exchanger 1340:

$$3CH_4 + 4H_2O \rightarrow 10H_2 + 2CO + CO_2 \qquad \text{Reaction Formula 1}$$

A structure of the reformer 1330 is not particularly limited. A known water vapor reforming device may be applied without limitation.

The second heat exchanger 1340 may be placed on top of the reformer 1330, and may heat the reformed fuel gas supplied from the reformer 1330 and supply the heated reformed fuel gas to the fuel cell module 1100. A structure of the second heat exchanger 1340 is not particularly limited. A known heat exchanger for a fuel cell may be applied without limitation. In one embodiment, the second heat exchanger 1340 may receive the hot unreacted air from the fuel cell module 1100, and may heat the reformed fuel gas via heat exchange thereof with the hot unreacted air.

In one example, the second module 1300 may further include at least one container (not shown) accommodating therein at least one of the mixer 1310, the first heat exchanger 1320, the reformer 1330 and the second heat exchanger 1340, respectively.

FIG. 3 is a cross-sectional view for illustrating one embodiment of the mixer shown in FIG. 1.

Referring to FIG. 3, the mixer 1310 may include an outer housing 1311, a first pressure-pulsation prevention plate 1312a, a second pressure-pulsation prevention plate 1312b, an inner housing 1313, a water vapor supply pipe 1314, and a fuel supply pipe 1315.

The outer housing 1311 may have an inner space defined therein, and may have an outlet 1311a for connecting the inner space thereof with the first heat exchanger 1320. A structure of the outer housing 1311 is not particularly limited when the inner space is defined therein to receive the fuel and the water vapor from the external fuel supply source 200 and the water-vapor generator 1230 of the first module 1200 respectively and mix the fuel and the water vapor with each other.

The first pressure-pulsation prevention plate 1312a and the second pressure-pulsation prevention plate 1312b may be spaced apart from each other and extend parallel to each other and may be disposed inside the outer housing 1311 and the divide the inner space of the outer housing 1311 into a first space 10, a second space 20, and a third space 30 between the first space 10 and the second space 20. In this connection, the outlet 1311a of the outer housing 1311 may connect the second space 20 to the outside. Each of the first and second pressure-pulsation prevention plates 1312a and 1312b may have a through-hole through which gases such as the water vapor and the fuel may pass.

The inner housing 1313 may be placed on top of the second pressure-pulsation prevention plate 1312b, and may have a fourth space 40 defined therein and may be received in the second space 20. In one embodiment, the inner housing 1313 includes a side wall extending upwardly from the second pressure-pulsation prevention plate 1312b and a cover covering a top of the side wall, and thus may define the fourth space 40 together with the second pressure-pulsation prevention plate 1312b. Through-holes through which gases such as the water vapor and the fuel may pass may be formed in the cover of the inner housing 1313.

In one embodiment, the water vapor supply pipe 1314 may be coupled to the outer housing 1311 and may be connected to the first space 10, and thus may receive the water vapor from the water-vapor generator 1230 of the first module 1200 and may supply the water vapor to the first space 10. Further, the fuel supply pipe 1315 may be coupled to the outer housing 1311 and the inner housing 1313 and may be connected to the fourth space 40, and may receive the fuel supplied from the fuel supply source 200 and may supply the fuel to the fourth space 40.

Alternatively, in another embodiment, the fuel supply pipe 1315 may be coupled to the outer housing 1311 and may be connected to the first space 10. The water vapor supply pipe 1314 may be coupled to the outer housing 1311 and the inner housing 1313 and may be connected to the fourth space 40.

In this manner, the inner space of the outer housing 1311 may be divided into a plurality of spaces via the pressure-pulsation prevention plates 1312a and 1312b having the through-holes formed therein. When the fuel and the water vapor are supplied to the different spaces, fluctuations in a pressure generated by a supply pump or during a water vaporization process, that is, the pressure-pulsation may be reduced, such that irregularity in the supply of the fuel gas to the first heat exchanger 1320 may be reduced.

To further reduce the irregularity in the supply of the mixed fuel gas due to the pressure-pulsation, the through-holes may be formed only in a central region C1 among the central region C1 and a peripheral region P1 surrounding the region C1 in the first pressure-pulsation prevention plate 1312a. The through-holes may be formed only in a peripheral region P2 among a central region C2 and the peripheral region P2 surrounding the region C2 in the second pressure-pulsation prevention plate 1312b. In addition, a position of the inner housing 1313 may correspond to the central region C2 of the second pressure-pulsation prevention plate 1312b, so that the fourth space 40 may not be directly connected to the third space 30.

In the fuel cell system according to the present disclosure, the heat-transfer device, the burner and the water-vapor generator are collected to form the first module, and the mixer, the first heat exchanger, the reformer and the second heat exchanger are collected to form the second module. Thus, a length of a pipe connecting the components to each other in each module may be minimized, thereby to minimize differential pressure and heat loss, as well as simplify an assembly process of the system and allow easy maintenance.

Moreover, the first module heats the air and generates the water vapor using one combustion device that burns the unreacted fuel gas and air, thereby to improve thermal efficiency. The water-vapor generator is capable of reducing the pressure-pulsation, such that the fuel gas may be uniformly supplied to the fuel cell module. Further, since the mixed fuel gas heated via the heat exchange is supplied to the reformer, and the reformed fuel gas is heated again via heat exchange and then is supplied to the fuel cell module, reforming efficiency and electricity generation efficiency may be improved.

The disclosure has been described with reference to the preferred embodiments of the present disclosure. Those skilled in the art will understand that the present disclosure may be variously modified and changed without departing from the spirit and scope of the present disclosure as described in the following claims.

What is claimed is:

1. A fuel cell system comprising:
a fuel cell module including a plurality of unit cells for generating electric energy using oxygen of air and hydrogen of reformed fuel gas;
a first module including:
a burner to burn unreacted fuel gas and air discharged from the fuel cell module;
a heat-transfer device placed adjacent to the burner to heat air via heat exchange thereof with flame and hot combusted gas generated from the burner and to supply the heated air to the fuel cell module; and
a water-vapor generator disposed adjacent to the burner to convert water moving therein to water vapor via heat exchange thereof with the hot combusted gas; and
a second module placed adjacent to the first module, wherein the second module is configured to:
mix fuel supplied from an external fuel supply source and the water vapor supplied from the water-vapor generator with each other to form a mixture;
perform a water vapor reforming reaction of the mixture; and
supply the reformed fuel gas to the fuel cell module
wherein the second module includes:
a mixer for mixing fuel supplied from the external fuel supply source and water vapor supplied from the water-vapor generator with each other to form a mixed fuel gas;
a first heat exchanger placed on top of the mixer for heating the mixed fuel gas supplied from the mixer via heat exchange thereof with hot unreacted fuel gas supplied from the fuel cell module;
a reformer placed on top of the first heat exchanger for performing a water vapor reforming reaction of the heated mixed fuel gas supplied from the first heat exchanger to generate the reformed fuel gas; and
a second heat exchanger placed on top of the reformer for heating the reformed fuel gas supplied from the reformer via heat exchange thereof with hot unreacted air supplied from the fuel cell module and supplying the heated reformed fuel gas to the fuel cell module.

2. A fuel cell system comprising:
a fuel cell module including a plurality of unit cells for generating electric energy using oxygen of air and hydrogen of reformed fuel gas;
a first module including:
a burner to burn unreacted fuel gas and air discharged from the fuel cell module;
a heat-transfer device placed adjacent to the burner to heat air via heat exchange thereof with flame and hot combusted gas generated from the burner and to supply the heated air to the fuel cell module; and
a water-vapor generator disposed adjacent to the burner to convert water moving therein to water vapor via heat exchange thereof with the hot combusted gas; and
a second module placed adjacent to the first module, wherein the second module is configured to:
mix fuel supplied from an external fuel supply source and the water vapor supplied from the water-vapor generator with each other to form a mixture;
perform a water vapor reforming reaction of the mixture; and
supply the reformed fuel gas to the fuel cell module;
wherein the heat-transfer device includes:
a first container having a first inner space defined therein, wherein the first container has a bottom having a first opening and a second opening defined therein for exposing the first inner space, wherein the first opening and the second opening are spaced from each other; and
a heat-exchange pipe received in the first inner space and having an inlet connected to an external air supply source and an outlet connected to the fuel cell module, wherein the burner includes:
an outer casing coupled to the bottom of the first container, wherein the outer casing has an open top and has a second inner space communicating with the first inner space through the first opening;
an inner casing received in the second inner space, wherein the inner casing has a third inner space defined therein, wherein a horizontal cross sectional area of the third inner space increases as the third inner space extends upwards, and wherein the inner casing has an open top, and a side wall having through-holes defined therein communicating the second inner space and the third inner space with each other;
an ignition device received in the third inner space;
a fuel supply pipe connected to the inner casing for supplying the unreacted fuel gas discharged from the fuel cell module to the third inner space; and
an air supply pipe connected to the outer casing for supplying the unreacted air discharged from the fuel cell module to the second inner space,
wherein the water-vapor generator includes:
a second container having a fourth inner space defined therein communicating with the first inner space through the second opening, wherein the second container is coupled to the bottom of the first container and is disposed adjacent to the outer casing; and
a vaporization pipe received in the fourth inner space and having an inlet connected to an external water supply source and an outlet connected to the second module.

3. The fuel cell system of claim 2, wherein the first container further includes a fluid guide plate protruding from the bottom of the first container to a first height.

4. The fuel cell system of claim 3, wherein the first height is smaller than a height of the first inner space, wherein a width of the fluid guide plate is equal to a width of the first inner space.

5. The fuel cell system of claim 3, wherein the heat-exchange pipe includes a plurality of straight portions extending in a parallel manner, and bent portions, each bent portion connecting adjacent straight portions to each other, wherein the fluid guide plate passes through at least some of the straight portions.

6. The fuel cell system of claim 2, wherein the burner further includes a diffusion mesh network disposed at an outlet of the fuel supply pipe to diffuse the unreacted fuel gas discharged from the fuel supply pipe.

7. The fuel cell system of claim 2, wherein an area of the second opening is smaller than an area of a top face of the fourth inner space.

8. The fuel cell system of claim 2, wherein the second container contacts the outer casing.

9. The fuel cell system of claim 2, wherein the second container has a combusted gas outlet to discharge combusted gas supplied from the first inner space through the second opening to an outside.

10. The fuel cell system of claim 1, wherein the second module further include a container for receiving therein at least one of the mixer, the first heat exchanger, the reformer and the second heat exchanger.

11. The fuel cell system of claim 1, wherein the mixer includes:
- an outer housing having an inner space defined therein and having an outlet for connecting the inner space thereof with the first heat exchanger;
- a first pressure-pulsation prevention plate received in the inner space of the outer housing to divide the inner space thereof into a first space and a remaining space, wherein first through-holes are defined in the first pressure-pulsation prevention plate;
- a second pressure-pulsation prevention plate received in the inner space of the outer housing and disposed on top of the first pressure-pulsation prevention plate, wherein the second pressure-pulsation prevention plate divides the remaining space to a second space connected to the first heat exchanger through the outlet and a third space located between the first space and the second space, wherein second through-holes are defined in the second pressure-pulsation prevention plate;
- an inner housing received in the inner space of the outer housing and disposed on top of the second pressure-pulsation prevention plate, wherein the inner housing is disposed in the second space and has a fourth space defined therein, wherein the inner housing has third through-holes for communicating the second space and the fourth space with each other, wherein the water vapor is supplied to one of the first space and the fourth space, and the fuel is supplied to the other of the first space and the fourth space.

12. The fuel cell system of claim 11, wherein the mixer further includes:
- a water vapor supply pipe coupled to the outer housing and connected to the first space for receiving the water vapor from the water-vapor generator and supplying the water vapor to the first space; and
- a fuel supply pipe coupled to the outer housing and the inner housing and connected to the fourth space for supplying the fuel received from the fuel supply source to the fourth space.

13. The fuel cell system of claim 11, wherein each of the first and second pressure-pulsation prevention plates has a central region and a peripheral region surrounding the central region,
- wherein the first through-holes are formed in the central region of the first pressure-pulsation prevention plate,
- wherein the second through-holes are formed in the peripheral region of the second pressure-pulsation prevention plate.

14. The fuel cell system of claim 13, wherein a position of the fourth space corresponds to the central region of the second pressure-pulsation prevention plate.

\* \* \* \* \*